(12) United States Patent  
Nanov

(10) Patent No.: US 8,737,024 B2
(45) Date of Patent: May 27, 2014

(54) SELF-ADJUSTABLE OVERCURRENT PROTECTION THRESHOLD CIRCUIT, A METHOD FOR GENERATING A COMPENSATED THRESHOLD SIGNAL AND A POWER SUPPLY EMPLOYING THE CIRCUIT OR METHOD

(75) Inventor: Ivan D. Nanov, Plano, TX (US)

(73) Assignee: General Electric Company, Schenectady, NY (US)

( * ) Notice: Subject to any disclaimer, the term of this patent is extended or adjusted under 35 U.S.C. 154(b) by 286 days.

(21) Appl. No.: 13/035,521

(22) Filed: Feb. 25, 2011

(65) Prior Publication Data

US 2011/0211282 A1 Sep. 1, 2011

Related U.S. Application Data

(60) Provisional application No. 61/308,371, filed on Feb. 26, 2010.

(51) Int. Cl.
*H02H 9/02* (2006.01)

(52) U.S. Cl.
USPC .......................................................... 361/18

(58) Field of Classification Search
USPC .................. 361/18; 323/282–286; 363/15, 16, 363/21.17
See application file for complete search history.

(56) References Cited

U.S. PATENT DOCUMENTS

| | | | | |
|---|---|---|---|---|
| 4,975,820 A | * | 12/1990 | Szepesi | 363/21.17 |
| 5,717,322 A | * | 2/1998 | Hawkes et al. | 323/283 |
| 6,498,466 B1 | * | 12/2002 | Edwards | 323/282 |
| 6,593,725 B1 | * | 7/2003 | Gallagher et al. | 323/284 |
| 6,611,131 B2 | | 8/2003 | Edwards | |
| 6,611,820 B2 | | 8/2003 | Oshima et al. | |
| 7,529,110 B1 | * | 5/2009 | Haines | 363/65 |
| 2004/0136207 A1 | * | 7/2004 | Havanur | 363/21.06 |
| 2006/0279965 A1 | * | 12/2006 | Nakamura | 363/16 |
| 2008/0246442 A1 | * | 10/2008 | Radke et al. | 320/162 |
| 2011/0080146 A1 | * | 4/2011 | Li et al. | 323/237 |

OTHER PUBLICATIONS

Modulation, http://www.thefreedictionary.com/modulation, taken Aug. 19, 2013.*
Texas Instruments Incorporated; www.ti.com; TPS40140 Dual or 2-Phase, Stackable Controller; SLUS66OF—Sep. 2005—Revised Sep. 2009; 67 pages.

* cited by examiner

*Primary Examiner* — Jared Fureman
*Assistant Examiner* — Kevin J Comber
(74) *Attorney, Agent, or Firm* — Dolly Wu; General Electric Company

(57) ABSTRACT

A power supply employing a compensated threshold signal for overcurrent protection and a method for generating the compensated threshold signal are disclosed herein. Additionally, a self-adjusting overcurrent threshold circuit is provided. In one embodiment, the self-adjusting overcurrent threshold circuit includes: (1) a fixed threshold source configured to provide a constant threshold signal for the overcurrent protection circuit, (2) an analog signal processor, coupled to the fixed threshold source, configured to monitor designated parameters of the converter and generate a threshold adjustment signal based thereon and (3) a combiner configured to combine the constant threshold signal with the threshold adjustment signal to provide the compensated threshold signal.

21 Claims, 6 Drawing Sheets

SELF-ADJUSTABLE OVERCURRENT PROTECTION THRESHOLD CIRCUIT, A METHOD FOR GENERATING A COMPENSATED THRESHOLD SIGNAL AND A POWER SUPPLY EMPLOYING THE CIRCUIT OR METHOD

CROSS-REFERENCE TO RELATED APPLICATION

This application claims the benefit of U.S. Provisional Application Ser. No. 61/308,371, filed on Feb. 26, 2010, entitled "SELF-ADJUSTABLE OVERCURRENT PROTECTION THRESHOLD CIRCUIT AND METHOD FOR SWITCHING POWER SUPPLIES," commonly assigned with this application and incorporated herein by reference.

TECHNICAL FIELD

This application is directed, in general, to power supplies and, more specifically, to overcurrent protection for power supplies.

BACKGROUND

Switching regulators are very commonly used in DC-DC conversion as they offer higher efficiency than linear regulators. In a basic form, a switching regulator, also referred to as a synchronous regulator, includes an inductor, a capacitor, a diode and a switch which switches the inductor alternately between charging and discharging states. These basic elements can be arranged to form, for example, a step-down (buck), a step-up (boost) and an inverting (buck-boost) regulator.

Control of the main switch or switches of a switching regulator may be achieved by techniques such as "voltage mode control" and "current-mode control." In a basic constant frequency voltage-mode control, the duty cycle of the switch is controlled by comparing the signal at the output of an error amplifier with a predetermined duty-cycle-independent synchronous sawtooth signal. At the beginning of each cycle, the main switch is set on and kept on until the sawtooth ramp reaches the value of the error amplifier output signal. At that moment the switch is turned off and not turned on again until the beginning of the next clock cycle. In this way the output voltage of the regulator can be controlled to the required value.

For a basic constant frequency current-mode controlled buck converter, the main switch is connected to an input voltage and is closed at the beginning of a clock cycle. Closing the switch causes the current in an inductor connected between the switch and the output of the converter to rise. This current is monitored and compared against the output of an error amplifier. The error amplifier may be an internal error amplifier of a PWM controller of the converter. When the output voltage of the inductor current monitor exceeds the output voltage of the error amplifier the switch is turned off and not turned on again until the beginning of the next clock cycle. In this way the output voltage of the regulator may be controlled to the required value.

A simplified current-mode control circuit may include a comparator and an R-S flip-flop. The comparator can compare the sum of a signal proportional to the current through inductor and an optional artificial ramp signal to a threshold signal. The artificial ramp signal is a predetermined duty-cycle-independent synchronous sawtooth signal that may be added to the measured inductor current to address sub-harmonic oscillation. To ensure stability for all duty cycles up to 100%, the slope of the artificial ramp signal should be equivalent to at least half of the anticipated maximum inductor current down slope.

At the beginning of each switching cycle, the flip-flop can be set from an internal or external clock signal, which asserts the duty cycle signal high. The inductor current begins to rise and so does the artificial ramp. When the sum of the later two exceeds the control signal, the comparator output changes state which resets the flip-flop and terminates the duty cycle. The described control principle forces the inductor current to follow the control signal transforming the switching regulator's inductor into a controlled current source.

SUMMARY

One aspect provides a self-adjusting overcurrent threshold circuit for generating a compensated threshold signal for an overcurrent protection circuit of a converter. In one embodiment, the self-adjusting overcurrent threshold circuit includes: (1) a fixed threshold source configured to provide a constant threshold signal for the overcurrent protection circuit, (2) an analog signal processor, coupled to the fixed threshold source, configured to monitor designated parameters of the converter and generate a threshold adjustment signal based thereon and (3) a combiner configured to combine the constant threshold signal with the threshold adjustment signal to provide the compensated threshold signal.

In another aspect, a method of generating a compensated threshold signal for an overcurrent protection circuit of a converter is disclosed. In one embodiment, the method includes: (1) providing a constant threshold signal for the overcurrent protection circuit, (2) monitoring system parameters of the converter, (3) generating a threshold adjustment signal based on the monitoring and (4) combining the constant threshold signal with the threshold adjustment signal to provide the compensated threshold signal.

In yet another aspect, a power supply is disclosed. In one embodiment, the power supply includes: (1) a converter configured to provide an output voltage and an output current and (2) an overcurrent protection circuit configured to limit the output current. The overcurrent protection circuit having: (2A) a comparator configured to generate an overcurrent signal by comparing a control signal representing an inductor current of the converter to a compensated threshold signal and (2B) a self-adjusting overcurrent threshold circuit configured to provide the compensated threshold signal from a constant threshold signal and a threshold adjustment signal based on operating parameters of the converter.

In still yet another aspect, an overcurrent protection circuit configured to limit an output current of a converter is disclosed. In one embodiment, the overcurrent protection circuit includes: (1) a comparator configured to generate an overcurrent signal by comparing a control signal representing an inductor current of the converter to a compensated threshold signal and (2) a self-adjusting overcurrent threshold circuit configured to provide the compensated threshold signal. The self-adjusting overcurrent threshold circuit having: (2A) a fixed threshold source configured to provide a constant threshold signal, (2B) an analog signal processor, coupled to the fixed threshold source, configured to monitor designated parameters of the converter, generate a threshold adjustment signal based thereon and (2C) a combiner configured to combine the constant threshold signal with the threshold adjustment signal to provide the compensated threshold signal.

BRIEF DESCRIPTION

Reference is now made to the following descriptions taken in conjunction with the accompanying drawings, in which.

Figure 5:
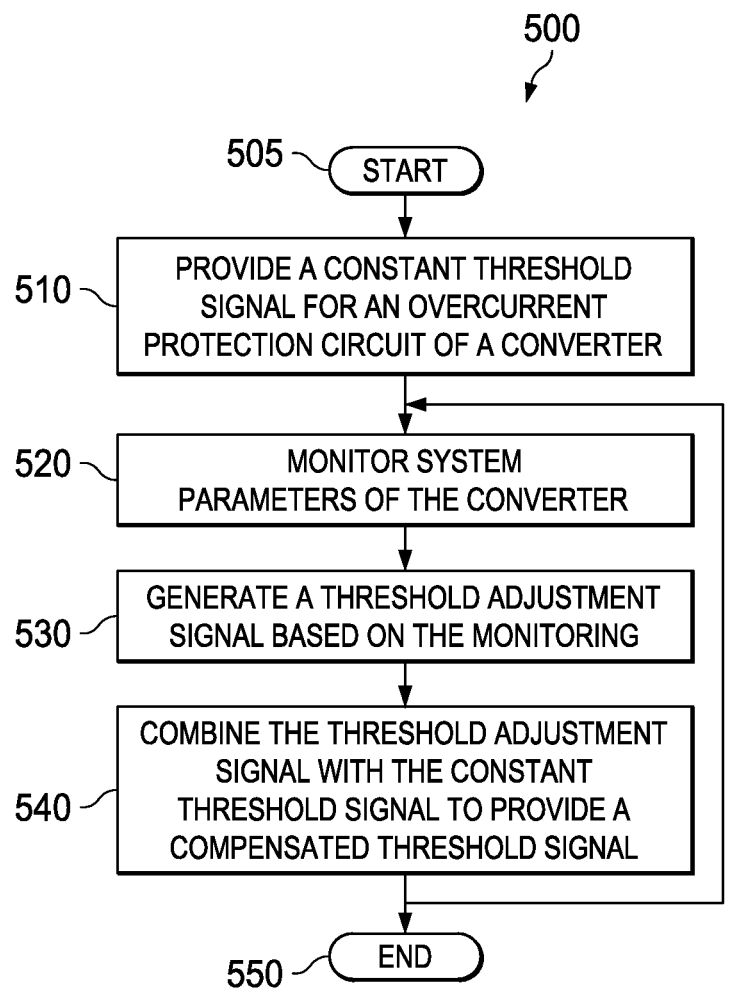
Figure 6:
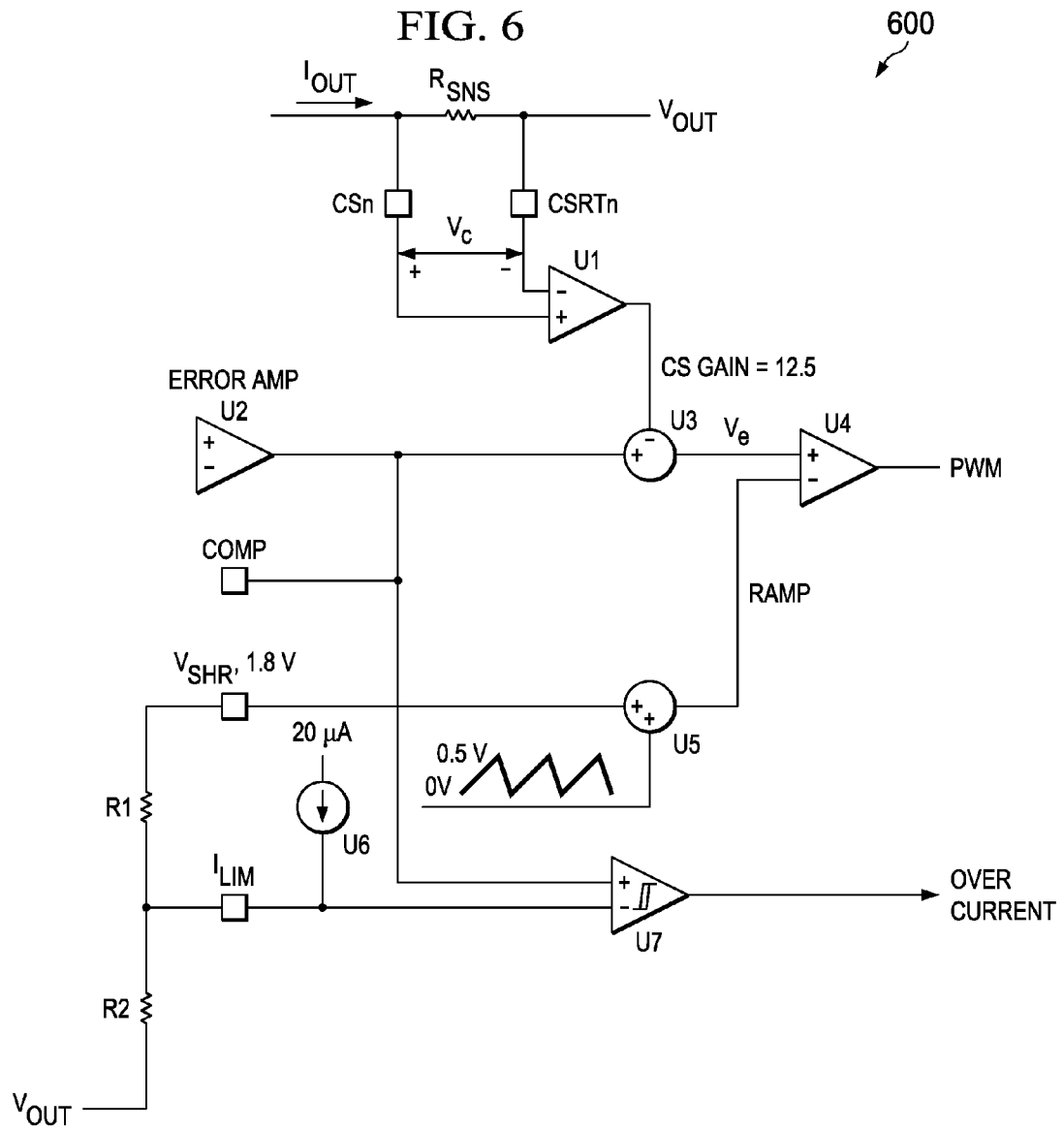

FIG. 5 illustrates a flow diagram of an embodiment of a method of a generating a compensated threshold signal for an overcurrent protection circuit of a converter carried out according to the principles of the disclosure; and FIG. 6 illustrates a partial schematic diagram of an example of a PWM controller that may be employed with a self-adjusting overcurrent threshold circuit constructed according to the principles of the disclosure.

DETAILED DESCRIPTION

The disclosure relates to a circuit and method of generating a self-adjustable threshold signal for overcurrent protection of a power supply (e.g., an AC-DC or DC-DC converter) that supplies an intended direct-current voltage to a load circuit by controlling the duty-ratio of a main switch (e.g., a Field Effect Transistor, or a FET) and controls the output current by adjusting the on-time of the main switch(es) when an overcurrent conditions occur. The self-adjustable threshold signal can compensate for the error associated with monitoring the peak inductor or branch current rather than the output DC current as well as other sources of errors that depend on the operating parameters of power supplies or converters and provides a constant (which includes substantially constant) overcurrent protection trip level that is not affected by, or independent of, the operating conditions of the power supplies or converters. A signal, such as the self-adjustable threshold signal, may be from a voltage source (i.e., a voltage signal) or from a current source (i.e., a current signal) as a voltage drop across a resistor.

For many applications it is desirable to limit the output current of the power supply to protect the load and the power source from destruction. Sensing the output current is not always practical or effective and protection is often achieved by monitoring a current other than the output current. For example, in voltage-mode controlled DC-DC converters such as buck and buck-derived topologies (forward, push-pull, half-bridge and full-bridge) a dedicated overcurrent protection comparator may compare a signal proportional to the inductor current or a current through the branch of the converter circuit (e.g., main switch, diode or synchronous FET) that is a true replica of the inductor current during a portion of the switching cycle to a threshold signal. Sensing the peak inductor current in buck-derived topologies instead of the inductor's DC current introduces an error that is a function of the inductor's AC ripple current. The error depends on inductance value and varies with input and output voltage. As the value of the threshold signal for overcurrent protection is typically set during the design stage of the converter and remains fixed during system operation, the above error can then only be compensated for a single operating point.

The overcurrent protection scheme employed in current-mode controlled converters may compare a signal proportional to the momentary value of the inductor current or a current through the branch of the converter circuit (e.g., main switch, diode or synchronous FET) that is a true replica of the inductor current during a portion of the switching cycle to a constant threshold signal to generate an overcurrent signal. This approach is prone to false triggering due to poor noise immunity. An alternative approach is to monitor and compare against a threshold level a low frequency signal that carries the peak inductor current value information such as the signal at the output of the voltage feedback amplifier. The disadvantage of both approaches employing a constant threshold signal is that the overcurrent fault signal is set based on the peak inductor current value, not the DC value which corresponds to the output current of, for example, buck derived converters. Sometimes, in current-mode controlled regulators particularly, the control signal that is compared to the overcurrent protection threshold is a sum of a signal proportional to the inductor current and the momentary value of the artificial ramp, which may or may not have DC offset. The difference between the average inductor current and the instantaneous inductor current at the instance the main switch turns off is an offset error, and is generally a function of the input and output voltage of the converter and the value of the output filter inductance of the converter. In similar manner, the artificial ramp superimposed on the current signal can introduce an additional error proportional to its slope and the duty cycle of the converter. Furthermore, the aforementioned offset errors may vary with the operating conditions of the converter, i.e., input and output voltages and duty cycle, and hence can only be compensated for at one particular operating condition. As such, the overcurrent protection tripping level varies. This is especially troublesome if converters are required to operate over a wide input voltage range or have output voltage programming capabilities. The variation could be significant if the inductor ripple is high.

Accordingly, the disclosure provides a self-adjusting overcurrent threshold circuit and method of generating a self-adjustable overcurrent protection threshold for use with, for example, switching power supplies. The circuit and the method are employable by, for example, but not limited to AC-DC and DC-DC switching power supplies which have protection circuitry that monitors, in a direct or indirect manner, inductor current having a DC value and a superimposed AC ripple of which only the DC value is considered a useful signal. The circuit and method include monitoring the system's parameters, such as the input voltage, output voltage, duty cycle of the main switch and/or others, and adjusting the current protection threshold to eliminate the error associated with the AC ripple component and/or other signals that may be added or superimposed on the monitored signal or to the threshold signal. The self-adjusting overcurrent protection circuit may consist of one or more pulse-width signal modulators, constant current or voltage sources and an adder that combines the outputs thereof in appropriate proportion.

Figure 1:
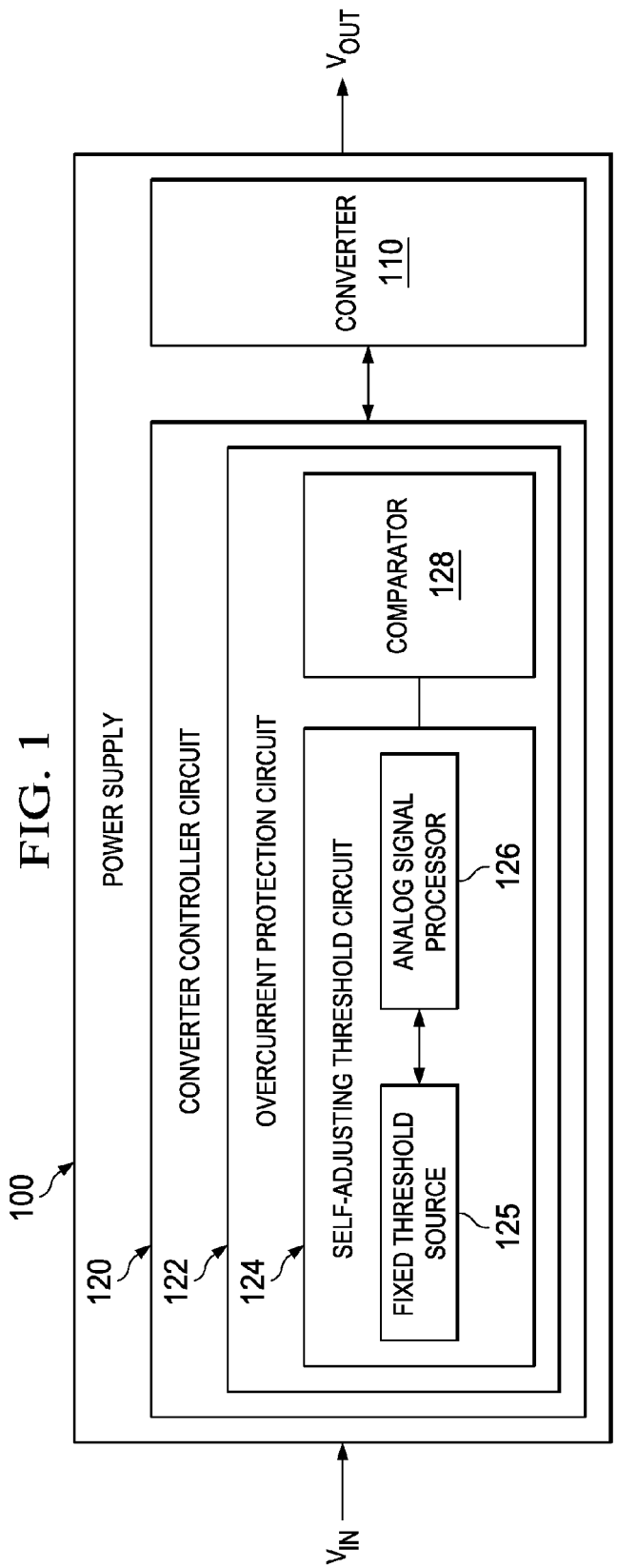
FIG. 1 illustrates a block diagram of an embodiment of a power supply constructed according to the principles of the disclosure.

FIG. 1 illustrates a block diagram of an embodiment of a power supply 100 constructed according to the principles of the disclosure. The power supply 100 includes a converter 110 and a converter controller circuit 120. The converter 110 may or may not be a synchronous converter. One skilled in the art will understand the general operation and configuration of a power supply and understand that the power supply 100 may include additional components or interfaces that are typically included therein.

The power supply 100 provides an output voltage $V_{OUT}$ from an input voltage $V_{IN}$. Typically, the converter 110 receives the input voltage $V_{IN}$ and generates the output voltage $V_{OUT}$. In one embodiment, the converter 110 may be an AC to DC converter that receives an AC input voltage and generates a DC output voltage. The converter 110 may also be a DC to DC converter that receives a DC input voltage and converts that DC input voltage to a different DC output voltage. The topology of the converter 110 may vary depending on the application. For example, the converter 110 may be a buck converter, a boost converter or a converter that employs a buck-boost topology. It may be also a converter with input to output isolation that has transformer between its input and output circuits. As such, the power supply 100 may be employed in various applications.

The converter 110 includes an inductor, a capacitor and a switch which switches the inductor alternately between charging and discharging states. The converter controller circuit 120 controls operation of the switch. In some embodiments, the converter controller circuit 120 may be configured to employ a voltage mode control scheme for the converter 110. In other embodiments, the converter controller circuit 120 may be configured to employ a current mode control scheme or another control principle for the converter 110. The converter controller circuit 120 may employ a pulse width modulator (PWM) controller for controlling operation of the switch of the converter 110. In other embodiments, the converter controller circuit 120 may employ other circuitry to control operation of the switch of the converter 110.

One protection scheme employed to protect the converter 110 is overcurrent protection. The overcurrent protection circuit 122 is configured to limit the output current of the converter 110. In one embodiment, the overcurrent protection circuit 122 is configured to generate an overcurrent signal by comparing a control signal representing an inductor current of the converter 110 to a compensated threshold signal.

The overcurrent protection circuit 122 includes a self-adjusting overcurrent threshold circuit 124 and a comparator 128. The self-adjusting overcurrent threshold circuit 124 is configured to provide the compensated threshold signal and the comparator 128 is configured to generate the overcurrent signal based thereon. The self-adjusting overcurrent threshold circuit 124 includes a fixed threshold source 125 configured to provide a constant threshold signal and an analog signal processor (ASP) 126, coupled to the fixed threshold source 125, that is configured to monitor designated parameters of the converter 110 and generate a threshold adjustment based thereon. The self-adjusting overcurrent threshold circuit 124 is configured to combine the constant threshold source signal with the threshold adjustment signal to provide the compensated threshold signal.

Figure 2:
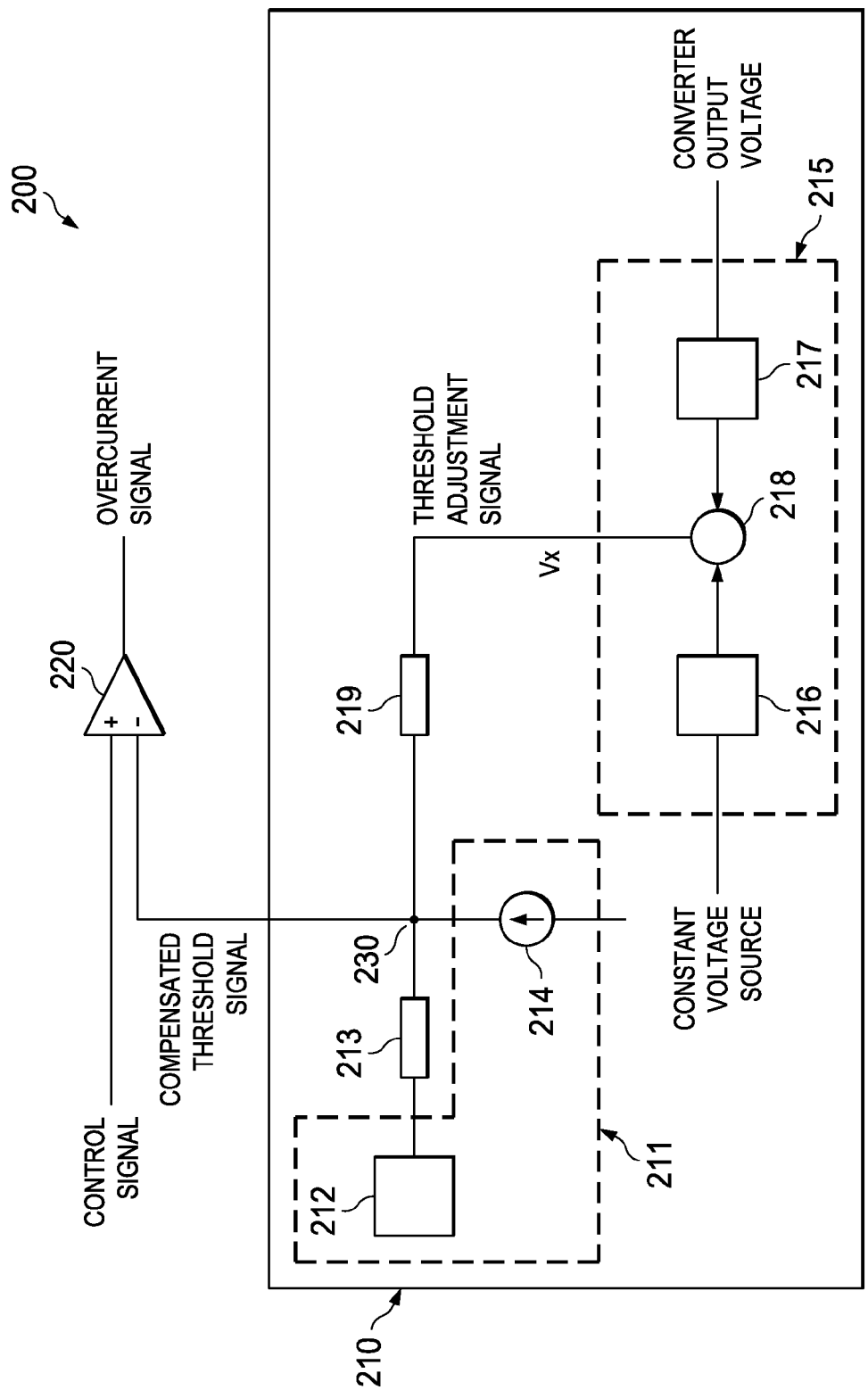
FIG. 2 illustrates a schematic diagram of an embodiment of an overcurrent protection circuit constructed according to the principles of the disclosure.

FIG. 2 illustrates a schematic diagram of an embodiment of an overcurrent protection circuit 200 including a self-adjusting overcurrent threshold circuit 210 constructed according to the principles of the present disclosure. The overcurrent protection circuit 200 may be employed, for example, in AC-DC or DC-DC converters. The overcurrent protection circuit 200 also includes an overcurrent comparator 220.

The self-adjusting overcurrent threshold circuit 210 is configured to generate a compensated threshold signal for the overcurrent comparator 220. The self-adjusting overcurrent threshold circuit 210 includes a fixed threshold source 211, an ASP 215 and a combiner 230. The combiner 230 is coupled to the fixed threshold source 211 via a resistor R213 and is coupled to the ASP 215 via a resistor R219. The fixed threshold source 211 may include a constant voltage source 212, a constant current source 214, or other arbitrary combinations of voltage sources, current sources and passive component network that produce a constant or substantially constant output signal. The output impedance of the fixed threshold source 211 should be such as to allow the voltage at the compensated threshold node to be changed by the ASP 215. The ASP 215 includes a first pulse-width modulator (PWM) 216, a second PWM 217 and an adder 218. In other embodiments, the ASP 215 may include additional PWMs connected to the adder 218. The polarity of the output signal of the circuits connected to the adder 218 may be positive or negative (i.e., their output signal may be added to or subtracted from the total).

The compensated threshold signal is produced by the ASP 215 interconnected to the fixed threshold source 211 by the resistors 213, 219, and the combiner 230 as shown. The purpose of the ASP 215 is to adjust the threshold delivered to the overcurrent comparator 220 in order to maintain the overcurrent protection's trip level constant and independent (or at least a substantially constant and independent) of the operating conditions, e.g., input voltage and output voltage, of the converter.

The fixed threshold source 211 provides a constant component, a constant threshold signal, of the compensated threshold signal. In other embodiments, another fixed threshold signal source may be built of arbitrary combinations and interconnections of resistors, voltage and current sources if they result in the same Thevenin equivalent circuit as the one particular implementation shown in FIG. 2, i.e., fixed threshold source 211. The constant threshold signal from the fixed threshold source 211 is adjusted by the output of the ASP 215, the threshold adjustment signal via the combiner 230. The combiner 230 may be an adder or a node. The threshold adjustment signal is used to adjust for, cancel or at least substantially reduce the difference, i.e., the error, between the converter's DC output current and the actual control signal used for overcurrent protection. The ASP 215 generates the threshold adjustment signal that is a sum of two signals: a first signal, provided by the first PWM 216, that is proportional to the duty cycle D of the main power converter, and a second signal, provided by second PWM 217, that is proportional to (1-D) portion of the switching cycle of the main power converter.

The output of the ASP 215 is substantially constant at specific operating conditions. The ASP 215 output, e.g., an output voltage, may change when the input and/or output voltages change. In this particular embodiment, the ASP 215 generates the threshold adjustment signal from two signals. In other embodiments, the number of signals may vary and can depend from the presence and nature of the error signals that need to be compensated.

The first PWM 216 and the second PWM 217 are configured to pulse-width modulate their respective input signals with D and (1-D) portion of the duty cycle of the power converter. The drive signals, which are not shown in FIG. 2, may be supplied independently. If one of the drive signals, either D or (1-D), is supplied to the ASP 215, the other could be generated internally by inversion of the supplied one. An input voltage for the first PWM 216 may be a constant voltage source and an input voltage for the second PWM 217 may be an output voltage of the converter. In one embodiment, the first PWM 216 and the second PWM 217 are driven with the D and (1-D) duty cycles of the main converter, respectively.

Figure 3:
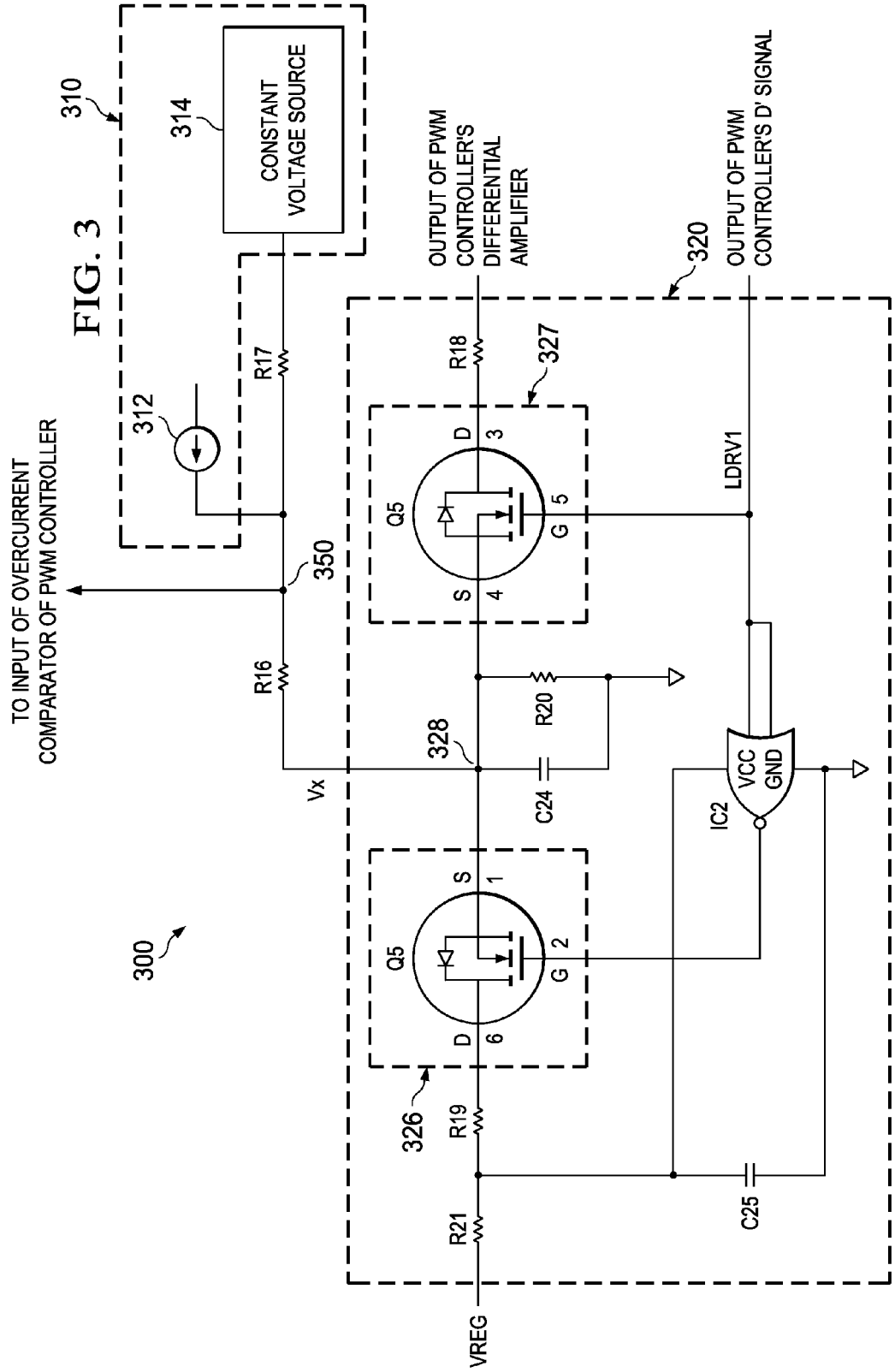
FIG. 3 illustrates a schematic diagram of an embodiment of a self-adjusting threshold circuit constructed according to the principles of the disclosure.

The content or synthesis of the ASP 215 depends on the type of offset errors designated to correct and may be based on if a current-mode control scheme or a voltage-mode controlled scheme is used. For a current mode control scheme, the ASP 215 includes the first PWM 216 and the second PWM 217. For a voltage mode control scheme, the ASP 215 can be simplified and include the second PWM 217, without the first PWM 216, when the second PWM 217 includes a low pass filter at its output. The low pass filter is needed to filter the output signal of the PWMs 216 and 217. The adjustment signal changes with the operating conditions and the response time is determined by the low pass filter bandwidth. Turning briefly to FIG. 3, the low pass filter may include R18, C24 for signal 217, and R19, C24 for signal 216.

The adder 218 may sum signals in pre-determined proportions. If the PWM 216 is not present, the adder 218 may essentially operate to add the output of the PWM 217 to a zero amplitude signal or non-zero amplitude but zero proportion signal of the PWM 216. In other words, turning again to FIG. 3, R19 is equal to infinity and R18, R19 and R20 determine the proportion the signals are summed and, therefore, constitute as part of the adder. The ASP 215 may include other PWMs, low pass filters and interconnections between them. For example, to produce a signal proportional to D*(1-D) the low pass filtered output of a PWM similar to 216 may be feed to PWM 217 or vice versa.

For current-mode controlled converters having an overcurrent protection scheme that monitors the output of an error amplifier of the converter controller, the output of the ASP 215 may be governed by equation 1:

$$V_X = k_1 D + k_2 V_O D', \qquad (eq. 1)$$

wherein $V_X$ is the threshold adjustment signal, D is the duty cycle of the main power switch of the converter, D' is 1-D and $V_O$ is the output voltage of the converter or the output of the output voltage differential amplifier if employed. $k_1$ and $k_2$ are constants independent of the operating conditions of the converter. For voltage-mode controlled converters having an overcurrent protection scheme that monitors the signal proportional to the inductor current or to a branch current that is a true replica of the inductor current during a portion of the switching cycle, the output of the ASP 215 may be governed by equation 2:

$$V_X = k_2 V_O D'. \qquad (eq. 2)$$

Figure 4:
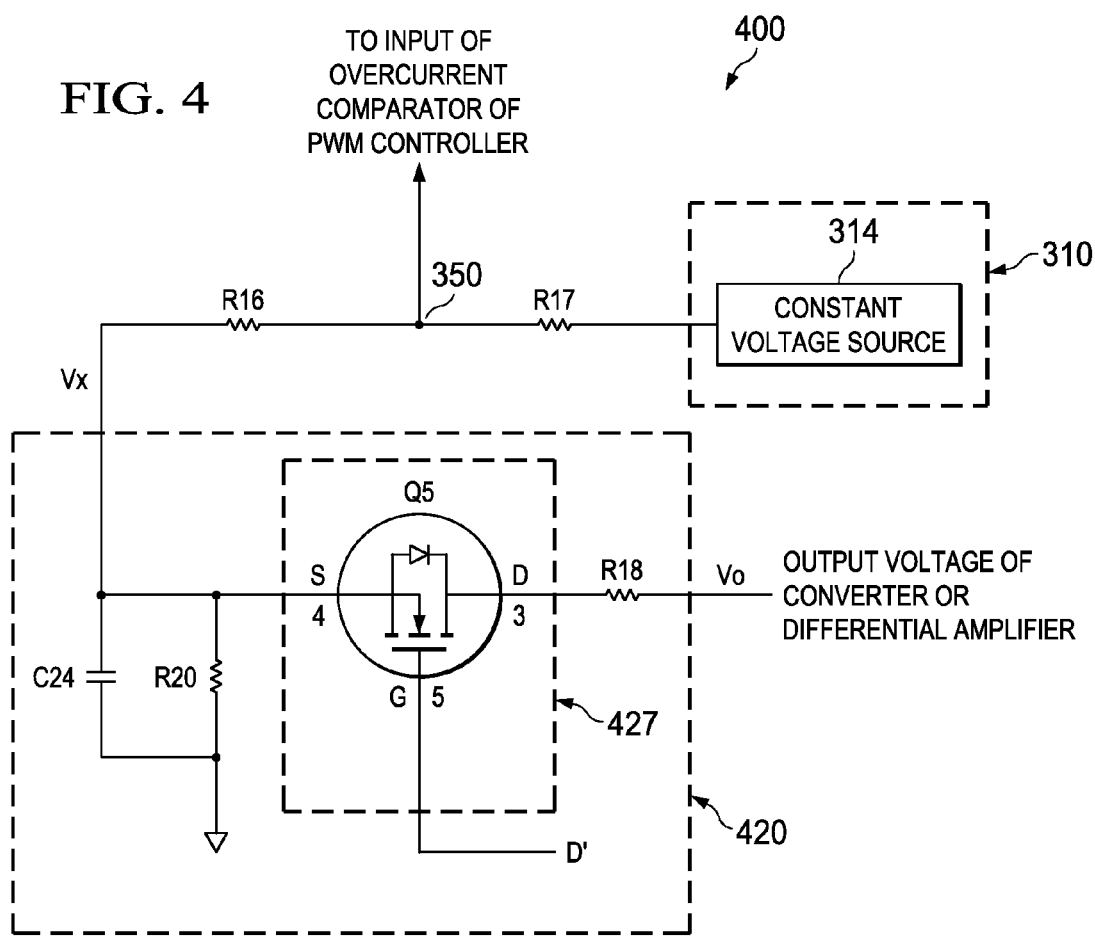
FIG. 4 illustrates a schematic diagram of another embodiment of a self-adjusting threshold circuit constructed according to the principles of the disclosure.

Circuit realizations of equations 1 and 2 are illustrated in FIG. 3 and FIG. 4, respectively. The below discussion regarding FIG. 3 and FIG. 4 may refer to the overcurrent protection circuit 200 of FIG. 2 to illustrate the relationship of the ASP's in FIG. 3 and FIG. 4 in an overcurrent protection circuit.

FIG. 3 illustrates a schematic diagram of an embodiment of self-adjusting threshold circuit 300 constructed according to the principles of the present disclosure. The self-adjusting threshold circuit 300 includes a fixed threshold source 310, an ASP 320 and a combiner 350. The output impedance of the fixed threshold source 310 must allow the ASP 320 to adjust the voltage on the combiner 350 connected to the overcurrent comparator. The combiner 350 is configured to combine the outputs of the fixed threshold source 310 and the ASP 320. The self-adjusting threshold circuit 300 may be for a current-mode controlled converter and for connecting to a PWM controller. A partial schematic of a PWM controller, a TPS40140 from Texas Instruments, Inc., of Dallas, Tex., is illustrated in FIG. 6 as an example of a PWM controller that can be employed. FIG. 6 illustrates the internal overcurrent circuit of the TPS40140 controller and associated external components. Of course other controllers and implementations which render the overcurrent protection threshold independent of operating conditions are also possible.

The fixed threshold source 310 includes a constant current source 312, a constant voltage source 314. The constant current and voltage sources 312, 314, may be internal to the associated PWM controller. For example, turning briefly to FIG. 6, the constant current source may be U6, and the internal constant voltage source, not shown in FIG. 6, may be connected to $V_{SHR}$ node. One of the inputs of the overcurrent protection comparator of the PWM controller is connected to the combiner 350 connecting R16 and R17. The input of the overcurrent comparator connected to combiner 350 may be an inverting or a non-inverting input depending on the PWM controller internal circuitry. For example, the ILIM terminal of the TPS40140 controller in FIG. 6 may be coupled to the combiner 350. The external resistors R17 and R16 in FIG. 3, are represented by resistors R213 and R219, respectively, in FIG. 2.

If the overcurrent protection is implemented as shown in FIG. 6, the overcurrent set point of the converter is determined by the values of the PWM controller's internal current source, voltage source, the resistors R2 and R1, which correspond to R16 and R17 in FIG. 3, and the output voltage of the converter Vo. As such, these parameters would be set by design wherein the overcurrent threshold is optimized for only one particular operating condition.

The ASP 320, however, can be used with a PWM controller to provide improved overcurrent protection for a converter. In FIG. 3, the resistor R16 is connected to the output Vx of the ASP 320, instead to Vo as per FIG. 6, which is automatically adjusted to the current operating conditions of an associated current-mode controlled power converter according to equation 1. The inputs for the ASP 320 are constant voltage source, in this particular embodiment—the output of an internal voltage regulator VREG of the PWM controller, the output of a remote sense differential amplifier DIFFO of the PWM controller which is equal to the output voltage Vo of the converter, and the PWM drive signal LDRV1, equal to the (1-D) duty cycle of the main power switch of the converter.

The ASP 320 includes a first PWM 326 and a second PWM 327 that may correspond to the first PWM 216 and the second PWM 217, respectively, of FIG. 2. Additionally, the ASP 320 includes a passive component network that consist of resistors R18, R19 and R20 and capacitor C24 that corresponds to the adder 218 of FIG. 2. The first PWM 326 is built of transistor Q5 (pins 1, 2 and 6). The output VREG of the internal voltage regulator of the PWM controller is filtered by resistor R21 and capacitor C25 to provide a constant input voltage to the first PWM 326. This input signal, the filtered VREG, is pulse-width modulated by the duty cycle D of the converter power stage, and the output is filtered, or integrated, by capacitor C24. In other embodiments, this input signal may be from an external voltage source. Resistors R19 and R20 together with resistors R16, R17 and VREG, determine the coefficient $k_1$ of equation 1. Similarly, the signal proportional to $V_O D'$ is generated by the second PWM 327 realized by transistor Q5 (pins 3, 4 and 5), and resistors R18, R20 and capacitor C24. To reduce cost, the first and second PWM 326, 327, may use a common filter capacitor. In another embodiment, the low pass filter may be implemented by splitting capacitor C24 in two, each half of which will appear connected across the outputs of the first and second PWMs 326, 327.

The output voltage Vo is derived from DIFFO, the output of the PWM controller's internal output voltage differential amplifier. The input signal of the second PWM 327 is pulse-width modulated with duty cycle D' supplied from the driver of the synchronous FET of the converter LDRV1. Resistors R16, R17, R18 and R20 determine the coefficient $k_2$ of equation 1. Capacitor C24 filters, or integrates the signal at the output of the ASP 320.

The drive signal D is obtained by inverting the D' signal. IC2 can be realized by NOR, NAND, inverter gates, or by other means. Operating together, both pulse-width modulators produce signal equal to the sum of their output signals. The voltage Vx at the output of the ASP 320 changes when Vo or Vin (respectively D) changes and maintains the overcurrent trip level independent of the operating conditions.

As mentioned above, in alternative embodiments, the IC2 in FIG. 3, a NOR gate, can be replaced by NAND gate, inverter or other circuit that inverts the input signal. The external DC voltage VREG is used to power the IC2 and as a DC source to produce a signal proportional to D. The filter of VREG, resistor R21 and capacitor C25 can be implemented in various ways. The control (drive) signals for transistors Q5 (pin2) and Q5 (pin 5) can be supplied separately, instead of using the logic IC to invert the D' or D signal. Gate drives can also be external to ASP 320.

Furthermore, one can see that the circuit can be simplified by utilizing only one of the signals with the appropriate D or D' gating to achieve overcurrent performance that is better than the original approach. This embodiment may be used if a simpler circuit is desired or if one of the sources of error is much smaller than the other and the improved performance of compensating both error terms isn't worth the cost of the added circuitry.

FIG. 4 illustrates a schematic diagram of another embodiment of a self-adjusting threshold circuit 400 constructed according to the principles of the disclosure. More specifically, FIG. 4 illustrates adjustable overcurrent protection of voltage-mode-controlled converters. The self-adjusting threshold circuit 400 includes the fixed threshold source 310, the combiner 350 and an ASP 420. The ASP 420 provides an implementation of an ASP for voltage-mode controlled converters and shows its interconnection to the overcurrent protection comparator. The overcurrent protection comparator may be internal or external to a PWM controller. The ASP 420 includes a PWM 427 that corresponds to the second PWM 217 of FIG. 2 and the second PWM 327 of FIG. 3. The output voltage Vo and the inverted duty cycle D'=(1-D) of the power converter are supplied as inputs to the ASP 420. The signal Vo is pulse-width modulated with duty cycle D' by transistor Q5, scaled down to desired proportion by resistors R18 and R20 and filtered or integrated by capacitor C24. Resistors R16, R17, R18 and R20 determine the coefficient $k_2$ of equation 2. Capacitor C24 filters/integrates the signal at the output Vx of the ASP 420. The output Vx of the ASP 420 is connected to an overcurrent protection comparator input via resistor R16. The fixed threshold source 310 provides a constant voltage source with appropriate amplitude to the overcurrent protection comparator input via resistor R17.

FIG. 5 illustrates a flow diagram of an embodiment of a method 500 of generating a compensated threshold signal for an overcurrent protection circuit of a converter carried out according to the principles of the disclosure. The method 500 may be performed by a self-adjusting threshold circuit as described herein. A converter controller or controller circuitry for a converter may be employed to perform at least part of the method 500. An overcurrent comparator of the converter controller or controller circuitry may employ the compensated threshold signal to generate an overcurrent signal to limit the output current of the converter. The overcurrent comparator may be a comparator of a PWM controller. The method 500 begins in a step 505.

In a step 510, a constant threshold signal for overcurrent protection circuit is provided. The constant threshold signal may be provided based on a constant voltage source and/or a constant current source and a passive network associated with the converter. The constant threshold signal may be provided via a constant voltage and/or current source of a PWM controller of the converter and external or partially external passive network. For example, considering FIG. 6, during POWER ON RESET, internal voltage (VSHARE) and current (U6 20uA) sources are set. Along with the other circuitry, they provide substantially constant threshold during start-up of the converter. In one embodiment, a fixed threshold source may provide the constant threshold signal. The output impedance of the threshold source must allow its output voltage to be adjusted by an external circuit connected to it.

The method 500 also includes monitoring system parameters of the converter in a step 520. The system parameters may be input voltage, output voltage, duty cycle of the main power switch, the on-time of the main power switch (control FET), the off-time of the main power switch (synchronous FET on-time) or other parameters that can be used to quantify the sources of error. For example, the error associated with sensing the peak inductor current instead of DC output current is a function of input voltage and duty cycle of the converter. An ASP may monitor Vo and duty cycle D, which is in turn is a function of Vin and Vo, and adjust its output.

In a step 530 a threshold adjustment signal is generated based on the monitoring. The threshold adjustment signal may be generated based on a type of offset error associated with the indirect converter's DC output current measurement on using peak inductor current information or other signal that may be indirectly related to the output current. In one embodiment, an ASP may monitor the system parameters and generate the threshold adjustment signal based thereon.

The compensated threshold signal is provided in a step 540 by combining the constant threshold signal with the threshold adjustment signal. In one embodiment, once the converter completes a soft-start and the output voltage reaches its desired value, the threshold adjustment signal also reaches its final value if none of the other monitored parameters changes. The minimal changes in input and output voltages due to ripples do not change significantly the output of the ASP. If during operation some of the monitored parameters changes the ASP output will be adjusted to maintain the same overcurrent tripping point. Since an ASP is an analog system, its output value is not memorized, but is maintained continuously by monitoring the system parameters.

After step 540, the method 500 then continues to step 520 and ends in a step 550 when, for example, the power supply is turned-off.

Those skilled in the art to which this application relates will appreciate that other and further additions, deletions, substitutions and modifications may be made to the described embodiments.

What is claimed is:

1. A self-adjusting overcurrent threshold circuit for generating a compensated threshold signal for an output overcurrent protection circuit of a converter, comprising:
    a fixed threshold source configured to provide a constant threshold signal for said overcurrent protection circuit;
    an analog signal processor, coupled to said fixed threshold source, and configured to monitor designated parameters of said converter and to generate a threshold adjustment signal based on the designated parameters; and
    a combiner configured to combine said constant threshold signal with said threshold adjustment signal to generate said compensated threshold signal, wherein the analog signal processor comprises pulse width modulators driven by a duty cycle of said converter and whose inputs couple to the designated parameters.

2. The circuit as recited in claim 1 wherein said threshold adjustment signal compensates for at least one offset error associated with an output current of said converter.

3. The circuit as recited in claim 2 wherein said offset error is a difference between said output current of said converter and an instantaneous current of an inductor at the instance a switch of said converter is turned-off, wherein said inductor is connected to an output of said converter.

4. The circuit as recited in claim 2, wherein said offset error is a slope compensation signal superimposed on an inductor current, wherein an inductor is connected to an output of said converter.

5. The circuit as recited in claim 2 wherein said offset error varies based on at least one operating condition of said converter.

6. The circuit as recited in claim 1 wherein said fixed threshold source and said analog signal processor are coupled together via at least one resistor.

7. The circuit as recited in claim 1 wherein said fixed threshold source includes a constant voltage source and constant current source.

8. A method of generating a compensated threshold signal for an overcurrent protection circuit of a converter comprising:
providing a constant threshold signal for said overcurrent protection circuit;
monitoring system parameters of said converter;
generating a threshold adjustment signal based on said monitored system parameters; and
combining said constant threshold signal with said threshold adjustment signal to provide said compensated threshold signal, wherein generating the threshold adjustment includes pulse width modulating and filtering the monitored system parameters.

9. The method as recited in claim 8, wherein said threshold adjustment signal compensates for at least one offset error associated with an output current of said converter.

10. The method as recited in claim 9 wherein said offset error is a difference between said output current of said converter and an instantaneous current of said inductor at the instance when a switch of said converter is turned-off.

11. The method as recited in claim 9 wherein said offset error is a slope compensation signal superimposed on said inductor current.

12. The method as recited in claim 9 wherein said offset error varies based on at least one operating condition of said converter.

13. The method as recited in claim 8 wherein said providing said constant threshold signal is based on a constant voltage source and a constant current source.

14. The method as recited in claim 8 wherein said generating a threshold adjustment signal is based on a type of offset error associated with an inductor current through an inductor of said converter.

15. A power supply, comprising:
a converter configured to provide an output voltage and an output current; and an overcurrent protection circuit configured to limit said output current, said overcurrent protection circuit including:
a comparator configured to generate an overcurrent signal by comparing a control signal representing an inductor current of said converter to a compensated threshold signal, and
a self-adjusting overcurrent threshold circuit configured to provide said compensated threshold signal from a constant threshold signal and a threshold adjustment signal based on operating parameters of said converter; and
the self-adjusting overcurrent threshold circuit includes a summer having input connections that couple to said operating parameters through pulse-width modulators.

16. The power supply as recited in claim 15 wherein said self-adjusting overcurrent threshold circuit includes a fixed threshold source configured to provide said constant threshold signal and an analog signal processor, coupled to said fixed threshold source, configured to monitor said operating parameters and generate said threshold adjustment signal based thereon.

17. The power supply as recited in claim 15 wherein said threshold adjustment signal compensates for at least one offset error associated with an output current of said converter.

18. The power supply as recited in claim 17 wherein said output current is maintained at a constant value under various operating conditions of said converter.

19. An overcurrent protection circuit configured to limit an output current of a converter, said overcurrent protection circuit comprising:
a comparator configured to generate an overcurrent signal by comparing a control signal representing an inductor current of said converter to a compensated threshold signal, and
a self-adjusting overcurrent threshold circuit configured to provide said compensated threshold signal, said self-adjusting overcurrent threshold circuit including:
a fixed threshold source configured to provide a constant threshold signal;
an analog signal processor, coupled to said fixed threshold source, configured to monitor designated parameters of said converter and generate a threshold adjustment signal based on the designated parameters; and
a combiner configured to combine said constant threshold signal with said threshold adjustment signal to provide said compensated threshold signal, wherein the analog signal processor includes a low-pass filter and pulse width modulators, whose inputs couple to the designated parameters.

20. The circuit as recited in claim 1 wherein the designated parameters comprise an output voltage and a duty cycle of the converter.

21. The power supply as recited in claim 15 wherein the operating parameters comprise the output voltage and an input voltage of the power supply.

* * * * *